United States Patent
Noh et al.

(10) Patent No.: US 8,730,850 B2
(45) Date of Patent: *May 20, 2014

(54) METHOD AND APPARATUS FOR TRANSMITTING REFERENCE SIGNAL IN TIME DIVISION DUPLEX SYSTEM

(75) Inventors: Min Seok Noh, Anyang-si (KR); Jae Hoon Chung, Anyang-si (KR); Han Gyu Cho, Anyang-si (KR); Yeong Hyeon Kwon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 143 days.

This patent is subject to a terminal disclaimer.

(21) Appl. No.: 13/391,887

(22) PCT Filed: Sep. 13, 2010

(86) PCT No.: PCT/KR2010/006225
§ 371 (c)(1),
(2), (4) Date: Feb. 23, 2012

(87) PCT Pub. No.: WO2011/034317
PCT Pub. Date: Mar. 24, 2011

(65) Prior Publication Data
US 2012/0155338 A1  Jun. 21, 2012

Related U.S. Application Data

(60) Provisional application No. 61/243,163, filed on Sep. 17, 2009.

(51) Int. Cl.
*H04J 3/00* (2006.01)

(52) U.S. Cl.
USPC .......................................................... 370/280

(58) Field of Classification Search
USPC .................................. 370/280, 329, 330, 478
See application file for complete search history.

(56) References Cited

U.S. PATENT DOCUMENTS

| | | | | |
|---|---|---|---|---|
| 8,503,375 | B2* | 8/2013 | Malladi et al. | 370/329 |
| 2008/0095195 | A1* | 4/2008 | Ahmadi et al. | 370/478 |
| 2009/0180435 | A1* | 7/2009 | Sarkar | 370/330 |
| 2010/0246455 | A1* | 9/2010 | Nangia et al. | 370/280 |
| 2010/0303034 | A1* | 12/2010 | Chen et al. | 370/329 |
| 2010/0322115 | A1* | 12/2010 | Wei et al. | 370/280 |

* cited by examiner

*Primary Examiner* — Chirag Shah
*Assistant Examiner* — Jael Ulysse
(74) *Attorney, Agent, or Firm* — Birch, Stewart, Kolasch & Birch, LLP

(57) ABSTRACT

A method and apparatus of transmitting a reference signal in a time division duplex (TDD) system is provided. A base station (BS) generates a plurality of demodulation reference signals (DMRSs) for respective layers, maps the plurality of DMRSs to a downlink pilot time slot (DwPTS) region for downlink transmission within a special subframe and transmits the plurality of DMRSs through a plurality of antennas. The special subframe is a subframe for separating uplink and downlink between an uplink (UL) subframe and a downlink (DL) subframe within a frame.

13 Claims, 16 Drawing Sheets

Antenna 0

METHOD AND APPARATUS FOR TRANSMITTING REFERENCE SIGNAL IN TIME DIVISION DUPLEX SYSTEM

CROSS REFERENCE TO RELATED APPLICATIONS

This application is the National Phase of PCT/KR2010/006225 filed on Sep. 13, 2010, which claims the benefit under 35 U.S.C. 119(e) of U.S. Provisional Application No. 61/243,163 filed on Sep. 17, 2009, all of which are hereby expressly incorporated by reference into the present application.

TECHNICAL FIELD

The present invention relates to wireless communication, and more particularly, to a method and apparatus for transmitting a reference signal in a time division duplex (TDD) system.

BACKGROUND ART

Effective transmission/reception methods and utilizations have been proposed for a broadband wireless communication system to maximize efficiency of radio resources. An orthogonal frequency division multiplexing (OFDM) system capable of reducing inter-symbol interference (ISI) with a low complexity is taken into consideration as one of next generation wireless communication systems. In the OFDM, a serially input data symbol is converted into N parallel data symbols, and is then transmitted by being carried on each of separated N subcarriers. The subcarriers maintain orthogonality in a frequency dimension. Each orthogonal channel experiences mutually independent frequency selective fading, and an interval of a transmitted symbol is increased, thereby minimizing inter-symbol interference.

When a system uses the OFDM as a modulation scheme, orthogonal frequency division multiple access (OFDMA) is a multiple access scheme in which multiple access is achieved by independently providing some of available subcarriers to a plurality of users. In the OFDMA, frequency resources (i.e., subcarriers) are provided to the respective users, and the respective frequency resources do not overlap with one another in general since they are independently provided to the plurality of users. Consequently, the frequency resources are allocated to the respective users in a mutually exclusive manner. In an OFDMA system, frequency diversity for multiple users can be obtained by using frequency selective scheduling, and subcarriers can be allocated variously according to a permutation rule for the subcarriers. In addition, a spatial multiplexing scheme using multiple antennas can be used to increase efficiency of a spatial domain.

MIMO technology can be used to improve the efficiency of data transmission and reception using multiple transmission antennas and multiple reception antennas. Schemes to implement transmission diversity in MIMO system include space frequency block code (SFBC), space time block code (STBC), cyclic delay diversity (CDD), frequency switched transmit diversity (FST), time switched transmit diversity TSTD), precoding vector switching (PVS), spatial multiplexing. An MIMO channel matrix according to the number of reception antennas and the number of transmission antennas can be decomposed into a number of independent channels. Each of the independent channels is called a layer or stream. The number of layers is called a rank.

In wireless communication systems, it is necessary to estimate an uplink channel or a downlink channel for the purpose of the transmission and reception of data, the acquisition of system synchronization, and the feedback of channel information. In wireless communication system environments, fading is generated because of multi-path time latency. A process of restoring a transmit signal by compensating for the distortion of the signal resulting from a sudden change in the environment due to such fading is referred to as channel estimation. It is also necessary to measure the state of a channel for a cell to which a user equipment belongs or other cells. To estimate a channel or measure the state of a channel, a Reference Signal (RS) which is known to both a transmitter and a receiver can be used.

A subcarrier used to transmit the reference signal is referred to as a reference signal subcarrier, and a resource element used to transmit data is referred to as a data subcarrier. In an OFDM system, a method of assigning the reference signal includes a method of assigning the reference signal to all the subcarriers and a method of assigning the reference signal between data subcarriers. The method of assigning the reference signal to all the subcarriers is performed using a signal including only the reference signal, such as a preamble signal, in order to obtain the throughput of channel estimation. If this method is used, the performance of channel estimation can be improved as compared with the method of assigning the reference signal between data subcarriers because the density of reference signals is in general high. However, since the amount of transmitted data is small in the method of assigning the reference signal to all the subcarriers, the method of assigning the reference signal between data subcarriers is used in order to increase the amount of transmitted data. If the method of assigning the reference signal between data subcarriers is used, the performance of channel estimation can be deteriorated because the density of reference signals is low. Accordingly, the reference signals should be properly arranged in order to minimize such deterioration.

A receiver can estimate a channel by separating information about a reference signal from a received signal because it knows the information about a reference signal and can accurately estimate data, transmitted by a transmit stage, by compensating for an estimated channel value. Assuming that the reference signal transmitted by the transmitter is p, channel information experienced by the reference signal during transmission is h, thermal noise occurring in the receiver is n, and the signal received by the receiver is y, it can result in y=h·p+n. Here, since the receiver already knows the reference signal p, it can estimate a channel information value $\hat{h}$ using Equation 1 in the case in which a Least Square (LS) method is used.

$$\hat{h} = y/p = h + n/p = h + \hat{n} \qquad \text{[Math. 1]}$$

The accuracy of the channel estimation value $\hat{h}$ estimated using the reference signal p is determined by the value $\hat{n}$ To accurately estimate the value h, the value $\hat{n}$ must converge on 0. To this end, the influence of the value $\hat{n}$ has to be minimized by estimating a channel using a large number of reference signals. A variety of algorithms for a better channel estimation performance may exist.

LTE rel-9 and LTE-A support dual layer beam-forming, and LTE-A supports up to eight transmission antennas in order to improve the throughput. Accordingly, there is a need for a pattern of a reference signal for supporting them. Further, a reference signal can be mapped to a Downlink Pilot Time Slot (DwPTS) region for downlink transmission within a special subframe of a TDD system, and the length of the DwPTS region can be changed according to a configuration of the special subframe. Accordingly, there is a need for a method of mapping a reference signal according to a regular reference signal pattern irrespective of the length of the DwPTS region.

SUMMARY OF INVENTION

Technical Problem

The present invention provides a method and apparatus for transmitting a reference signal in a time division duplex (TDD) system.

Solution to Problem

In an aspect, a method of transmitting a reference signal in a time division duplex (TDD) system is provided. The method include generating a plurality of demodulation reference signals (DMRSs) for respective layers, mapping the plurality of DMRSs to a downlink pilot time slot (DwPTS) region for downlink transmission within a special subframe, and transmitting the plurality of DMRSs through a plurality of antennas, wherein the special subframe is a subframe for separating uplink and downlink between an uplink (UL) subframe and a downlink (DL) subframe within a frame. The DwPTS region may occupy 10 to 12 orthogonal frequency division multiplexing (OFDM) symbols in case where the special subframe has a normal cyclic prefix (CP) structure, and the DwPTS region may occupy 9 or 10 OFDM symbols in case where the special subframe has an extended CP structure. The number of layers may be 2 or 4. The plurality of mapped DMRSs may be multiplexed in accordance with a code division multiplexing (CDM) method using an orthogonal sequence. The orthogonal sequence may include one of a Walsh code, discrete Fourier transform (DFT) coefficients, and a constant amplitude zero auto-correlation (CAZAC). A length of the orthogonal sequence may be 2 or 4. Some or all of the plurality of DMRSs for the respective layers may be mapped to neighbor OFDM symbols within an identical subcarrier. Some or all of the plurality of DMRSs for the respective layers may be mapped to neighbor subcarriers within an identical OFDM symbol. Each of the DMRSs may be mapped at a certain subcarrier interval.

In another aspect, an apparatus for transmitting a reference signal in a time division duplex (TDD) system is provided. The apparatus include a radio frequency (RF) unit, and a processor, coupled to the RF unit, and configured to generate a plurality of demodulation reference signals (DMRSs) for respective layers, map the plurality of DMRSs to a downlink pilot time slot (DwPTS) region for downlink transmission within a special subframe, and transmit the plurality of DMRSs through a plurality of antennas, wherein the special subframe is a subframe for separating uplink and downlink between an UL subframe and a DL subframe within a frame. The DwPTS region may occupy 10 to 12 OFDM symbols in case where the special subframe has a normal CP structure and the DwPTS region may occupy 9 or 10 OFDM symbols in case where the special subframe has an extended CP structure. The number of layers may be 2 or 4. The plurality of mapped DMRSs may be multiplexed in accordance with a CDM method using an orthogonal sequence. Some or all of the plurality of DMRSs for the respective layers may be mapped to neighbor OFDM symbols within an identical subcarrier. Some or all of the plurality of DMRSs for the respective layers may be mapped to neighbor subcarriers within an identical OFDM symbol.

Advantageous Effects of Invention

In a time division duplex (TDD) system, a reference signal can be efficiently transmitted because a Demodulation Reference Signal (DMRS) is mapped according to the same pattern irrespective of the length of a DwPTS (Downlink Pilot Time Slot) of a special subframe.

MODE FOR THE INVENTION

A technology below can be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented using radio technology, such as Universal Terrestrial Radio Access (UTRA) or CDMA2000. TDMA can be implemented using radio technology, such as Global System for Mobile communications (GSM)/General Packet Radio Service (GPRS)/Enhanced Data Rates for GSM Evolution (EDGE). OFDMA can be implemented using radio technology, such as IEEE 802.11 (Wi-Fi), IEEE 802.16(WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a Universal Mobile Telecommunications System (UMTS). 3rd Generation Partnership Project (3GPP) Long Term Evolution (LET) is part of Evolved UMTS (E-UMTS) using Evolved-UMTS Terrestrial Radio Access (E-UTRA), and it adopts OFDMA in downlink (DL) and SC-FDMA in uplink (UL). LTE-A (Advanced) is the evolution of 3GPP LTE.

LTE/LTE-A is chiefly described as an example in order to clarify the description, but the technical spirit of the present invention is not limited to LTE/LTE-A.

Figure 1:
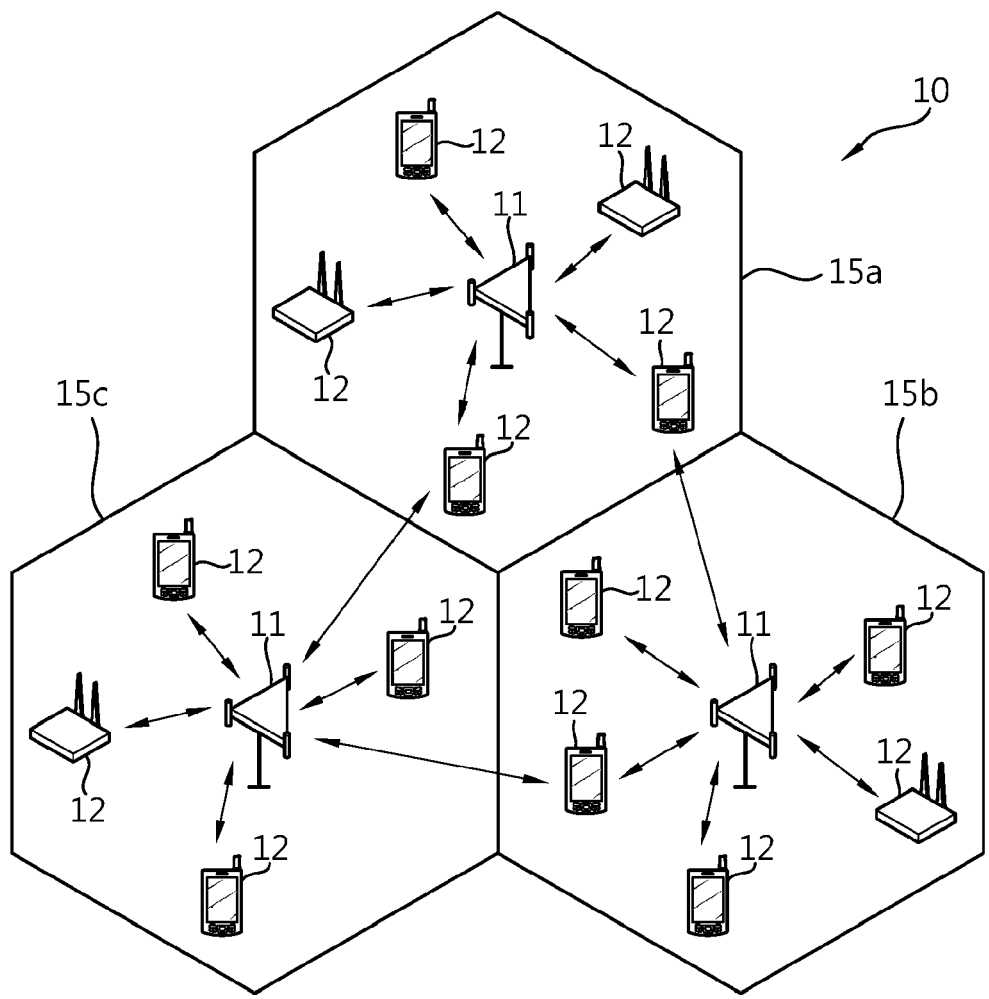
FIG. 1 shows a wireless communication system.

FIG. 1 shows a wireless communication system.

Referring to FIG. 1, the wireless communication system 10 includes one or more Base Stations (BSs) 11. The BSs 11 provide communication services to respective geographical areas (in general called 'cells') 15a, 15b, and 15c. Each of the cells can be divided into a number of areas (called 'sectors'). A User Equipment (UE) 12 can be fixed or mobile and may be referred to as another terminology, such as a Mobile Station (MS), a Mobile Terminal (MT), a User Terminal (UT), a Subscriber Station (SS), a wireless device, a Personal Digital Assistant (PDA), a wireless modem, or a handheld device. In general, the BS 11 refers to a fixed station that communicates with the UEs 12, and it may be referred to as another terminology, such as an evolved-NodeB (eNB), a Base Transceiver System (BTS), or an access point.

The UE belongs to one cell generally. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
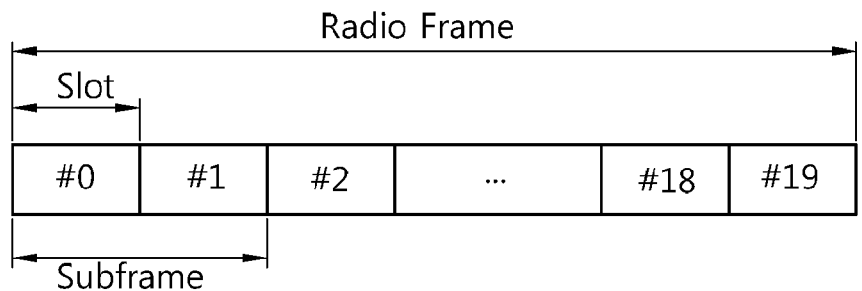
FIG. 2 shows the structure of a radio frame in the 3GPP LTE specifications.

FIG. 2 shows the structure of a radio frame in the 3GPP LTE specifications. For the radio frame structure, reference can be made to Paragraph 5 of 3GPP (3$^{rd}$ Generation Partnership Project) TS 36.211 V8.2.0 (2008-03) "Technical Specification Group Radio Access Network; Evolved Universal Terrestrial Radio Access (E-UTRA); Physical channels and modulation (Release 8)".

Referring to FIG. 2, the radio frame includes ten sub-frames, and one sub-frame includes two slots. The slots within the radio frame are allocated slot numbers from #0 to #19. The time that it takes to transmit one sub-frame is called a Transmission Time Interval (TTI). The TTI can be called a scheduling unit for data transmission. For example, the length of one radio frame can be 10 ms, the length of one sub-frame can be 1 ms, and the length of one slot may be 0.5 ms.

One slot includes a plurality of Orthogonal Frequency Division Multiplexing (OFDM) symbols in the time domain and a plurality of subcarriers in the frequency domain. The OFDM symbol is used to represent one symbol period because the 3GPP LTE specifications use OFDMA in the downlink. The OFDM symbol can be called another terminology according to the multi-access method. For example, in the case in which SC-FDMA is used as an uplink multi-access method, corresponding symbols can be called SC-FDMA symbols. A Resource Block (RB) is the unit of resource allocation, and it includes a plurality of consecutive subcarriers in one slot. The structure of a radio frame is only an example. The number of sub-frames included in a radio frame, the number of slots included in a sub-frame, or the number of OFDM symbols included in a slot can be changed in various ways.

In the 3GPP LTE specifications, one slot is defined to include seven OFDM symbols in a normal Cyclic Prefix (CP), and one slot is defined to include six OFDM symbols in the extended CP.

Figure 3:
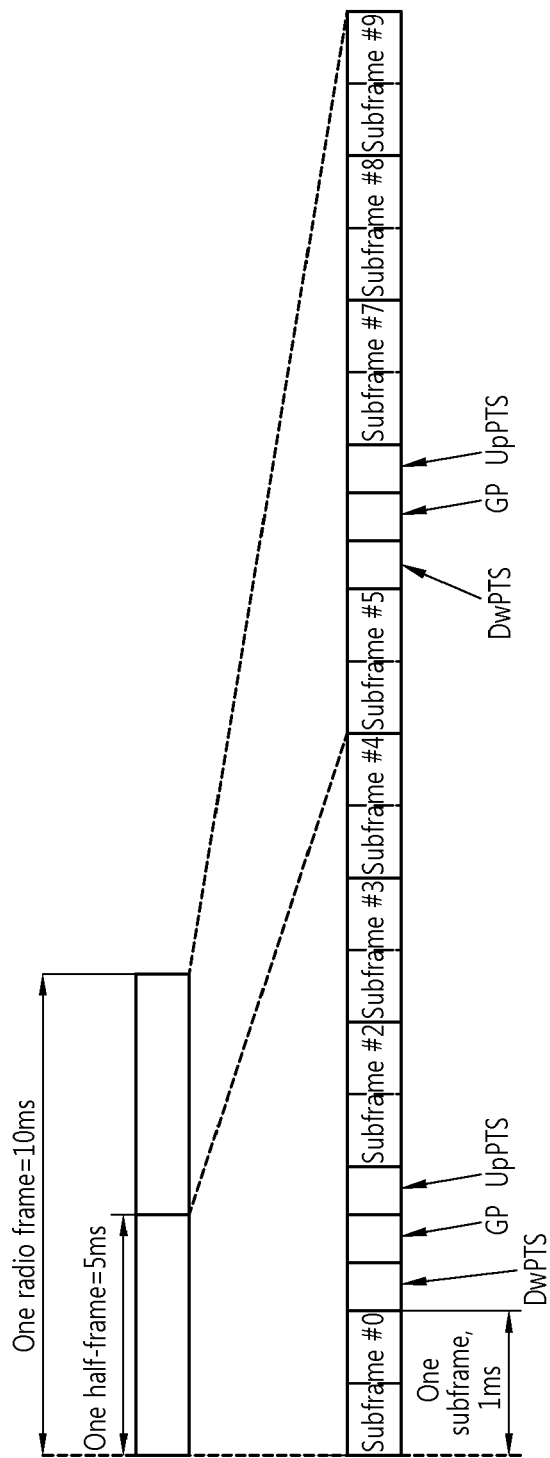
FIG. 3 shows the structure of a TDD radio frame in 3GPP LTE.

FIG. 3 shows the structure of a TDD radio frame in 3GPP LTE. For the TDD radio frame in 3GPP LTE, reference can be made to Paragraph 4.2 of 3GPP TS 36.211 V8.2.0 (2008-03) "Technical Specification Group Radio Access Network; Evolved Universal Terrestrial Radio Access (E-UTRA); Physical Channels and Modulation (Release 8)". One radio frame has a length of 10 ms and consists of two half-frames each having a length of 5 ms. Further, one half-frame consists of five subframes each having a length of 1 ms.

A subframe is designated as any one of an UL (uplink) subframe, a DL (downlink) subframe, and a special subframe. Table 1 shows the structure of a configurable frame according to the arrangement of UL subframes and DL subframes in a 3GPP LTE TDD system. In Table 1, D indicates a DL subframe, U indicates an UL subframe, and S indicates a special subframe.

TABLE 1

| Uplink-downlink configuration | Downlink-to-Uplink Switch-point periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

A configuration having the switch-point periodicity of 5 ms and a configuration having the switch-point periodicity of 10 ms can exist. When the switch-point periodicity is 5 ms, the special subframe can exist both in two half-frames within one subframe. When the switch-point periodicity is 10 ms, the special subframe can exist only in the first half-frame.

The special subframe is a specific period to separate uplink and downlink between the UL subframe and the DL subframe. At least one special subframe exists in one radio frame. The special subframe includes a DwPTS (Downlink Pilot Time Slot), a GP (Guard Period), and an UpPTS (Uplink Pilot Time Slot). The DwPTS is used for initial cell search, synchronization, or channel estimation. The UpPTS is used for channel estimation in a base station and for uplink transmission synchronization of a user equipment. The GP is used to eliminate interference generated in uplink because of multi-path delay of a DL signal between uplink and downlink. Table 2 shows the lengths of the DwPTS, the GP, and the UpPTS according to the configuration of the special subframe.

TABLE 2

| Special sub-frame con-figuration | Normal CP in downlink | | | Extended CP in downlink | | |
|---|---|---|---|---|---|---|
| | | UpPTS | | | UpPTS | |
| | DwPTS | Normal CP in uplink | Extended CP in uplink | DwPTS | Normal CP in uplink | Extended CP in uplink |
| 0 | 6592*Ts | 2192*Ts | 2560*Ts | 7680*Ts | 2192*Ts | 2560*Ts |
| 1 | 19760*Ts | | | 20480*Ts | | |
| 2 | 21952*Ts | | | 23040*Ts | | |
| 3 | 24144*Ts | | | 25600*Ts | | |
| 4 | 26336*Ts | | | 7680*Ts | 4384*Ts | 5120*ts |
| 5 | 6592*Ts | 4384*Ts | 5120*ts | 20480*Ts | | |
| 6 | 19760*Ts | | | 23040*Ts | | |
| 7 | 21952*Ts | | | — | | |
| 8 | 24144*Ts | | | — | | |

A subframe 0, a subframe 5, and the DwPTS of a special subframe are always allocated for downlink transmission. The UpPTS of a special subframe and a subframe following the special subframe are always allocated for uplink transmission.

Figure 4:
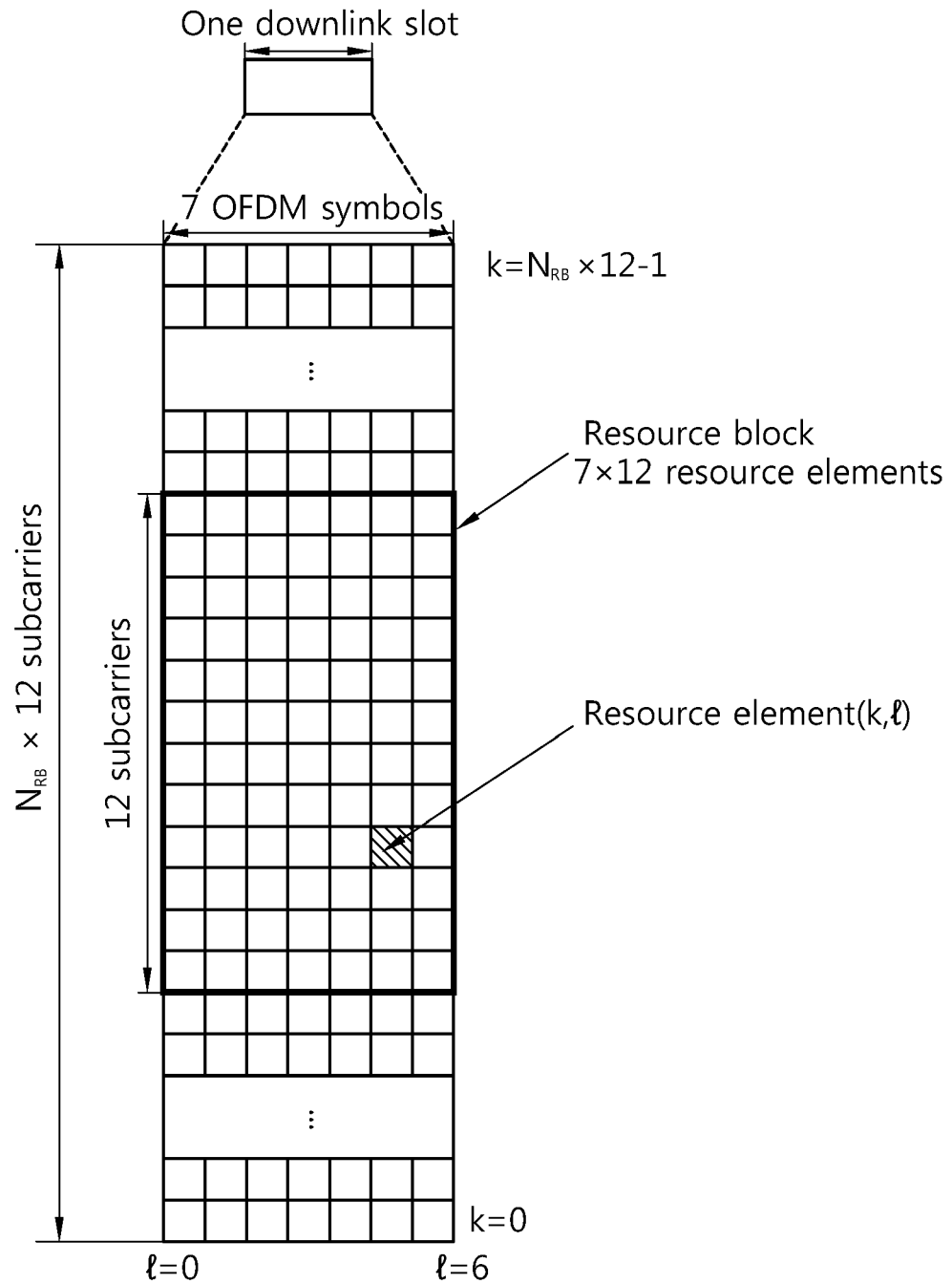
FIG. 4 shows an example of a resource grid for one downlink slot.

FIG. 4 shows an example of a resource grid for one downlink slot.

The downlink slot includes a plurality of OFDM symbols in the time domain and $N_{RB}$ resource blocks in the frequency domain. The number of resource blocks $N_{RB}$ included in a downlink slot is dependent on a downlink transmission bandwidth set in a cell. For example, in the LTE system, the number of resource blocks $N_{RB}$ may be one of 60 to 110. One resource block includes a plurality of subcarriers in the frequency domain. The structure of an uplink slot can be identical with that of the downlink slot.

Each of elements on the resource grid is called a resource element. The resource element on the resource grid can be identified by an index pair (k, l) within a slot. Here, k(k=0, . . . , $N_{RB}$×12-1) denotes a subcarrier index in the frequency domain, and l (l=0, . . . , 6) denotes an OFDM symbol index in the time domain.

In this case, one resource block is illustrated to include 7×12 resource elements, including 7 OFDM symbols in the time domain and 12 subcarriers in the frequency domain. However, the number of OFDM symbols and the number of subcarriers within a resource block are not limited to the 7×12 resource elements. The number of OFDM symbols and the number of subcarriers can be variously changed depending on the length of a CP, frequency spacing, and so on. For example, in the normal CP, the number of OFDM symbols can be 7, and in the extended CP, the number of OFDM symbols can be 6. In one OFDM symbol, the number of subcarriers can be one of 128, 256, 512, 1024, 1536, and 2048.

Figure 5:
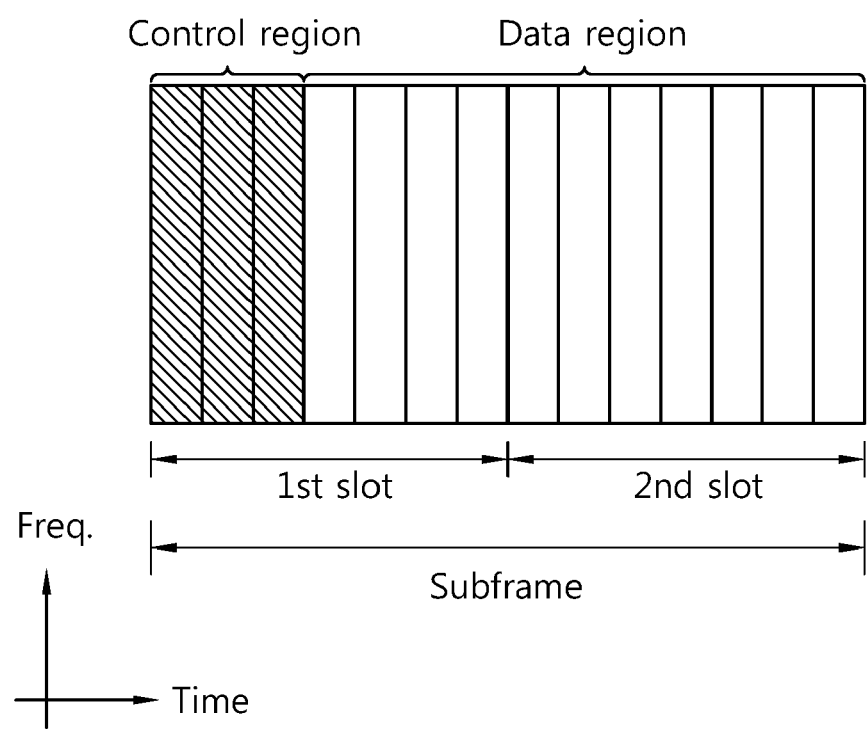
FIG. 5 shows the structure of a DL subframe.

FIG. 5 shows the structure of a DL subframe.

The DL subframe includes 2 slots in the time domain, and each of the slots includes 7 OFDM symbols in a normal CP. A maximum of 3 OFDM symbols (a maximum of 4 OFDM symbols in a 1.4 MHz bandwidth) ahead placed in the first slot of the DL subframe constitute a control region to which control channels are allocated. The remaining OFDM symbols constitute a data region to which PDSCHs (Physical Downlink Shared Channels) are allocated.

A PDCCH can carry information about resource allocation and a transmission format of a DL-SCH (Downlink-Shared Channel), information about resource allocation of an UL-SCH (Uplink Shared Channel), paging information on a PCH, system information on a DL-SCH, information about resource allocation of a higher layer control message such as a random access response transmitted on a PDSCH, information about a set of transmission power control commands for UEs within a certain UE group, information about the activation of a VoIP (Voice over Internet Protocol), and so on. A plurality of PDCCHs can be transmitted within the control region. A UE can monitor a plurality of PDCCHs. The PDCCHs are transmitted one or an aggregation of several continuous CCEs (Control Channel Elements). The CCE is a logical allocation unit which is used to provide the PDCCH with the coding rate according to the state of a radio channel. The CCE corresponds to a plurality of resource element groups. The format of the PDCCH and the bit number of available PDCCHs are determined according to the number of CCEs and a correlation of the coding rate provided by CCEs.

A base station determines a PDCCH format on the basis of Downlink Control Information (DCI) to be transmitted to a UE and attaches a Cyclic Redundancy Check (CRC) to the control information. A unique identifier (e.g., a Radio Network Temporary Identifier (RNTI)) is masked to the CRC according to the owner or use of the PDCCH. If the PDCCH is a PDCCH for a specific UE, a unique identifier (e.g., a Cell-RNTI (C-RNTI)) of the UE can be masked to the CRC. In an alternative example, if the PDCCH is a PDCCH for a paging message, a paging indication identifier (e.g., a Paging-RNTI (P-RNTI)) can be masked to the CRC. If the PDCCH is a PDCCH for a System Information Block (SIB), a system information identifier (e.g., System Information-RNTI (SI-RNTI)) can be masked to the CRC. In order to indicate a random access response which is a response to the transmission of a random access preamble by a UE, a Random Access-RNTI (RA-RNTI) can be masked to the CRC.

Figure 6:
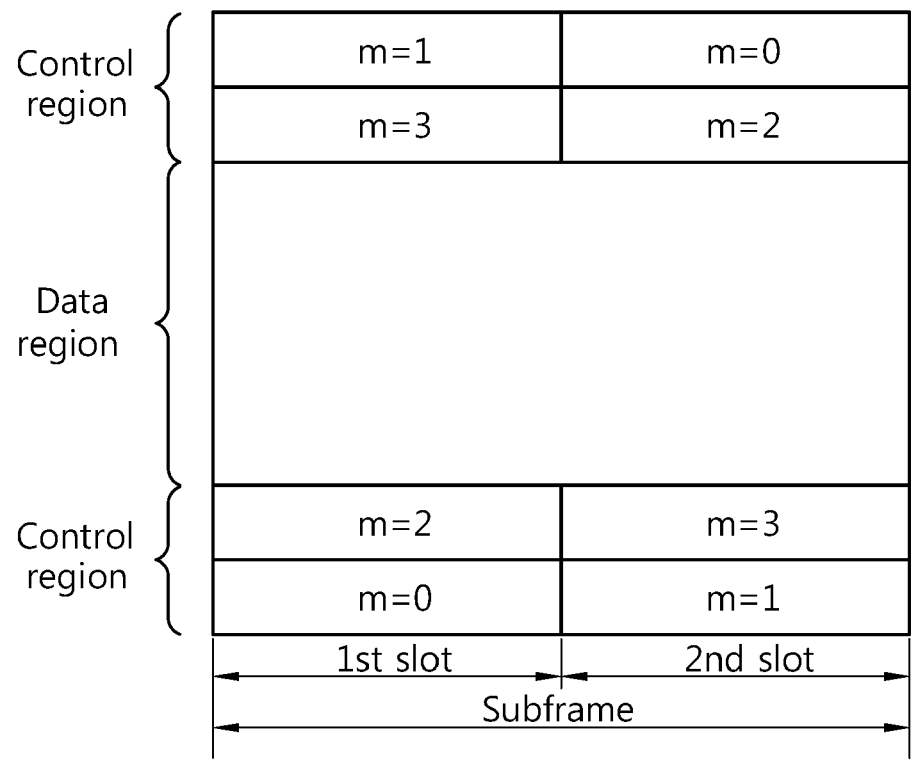
FIG. 6 shows the structure of an UL subframe.
Figure 6:
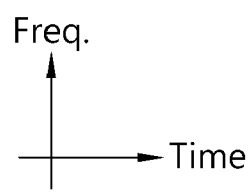

FIG. 6 shows the structure of an UL subframe.

The UL subframe can be divided into a control region and a data region in the frequency domain. PUCCHs (Physical Uplink Control Channels) in which UL control information is transmitted are allocated to the control region. PUSCHs (Physical Uplink Shared Channels) in which data are transmitted are allocated to the data region. In order to maintain the characteristic of a single carrier, a UE does not transmit the PUCCH and the PUSCH at the same time.

PUCCHs for one UE are allocated in the form of a Resource Block (RB) pair in the subframe. Resource blocks belonging to an RB pair occupy different subcarriers in a first slot and a second slot. A frequency occupied by the resource blocks, belonging to the RB pair allocated to the PUCCHs, is changed on the basis of the slot boundary. This is said that the RB pair allocated to the PUCCHs has frequency-hopped in the slot boundary. A UE can obtain a frequency diversity gain by transmitting UL control information through different subcarriers according to a lapse of time. In FIG. 6, m is a position index to indicate the logical frequency domain location of an RB pair allocated to PUCCHs within a subframe.

The UL control information transmitted on the PUCCHs include a Hybrid Automatic Repeat request (HARQ), Acknowledgement (ACK)/Non-acknowledgement (NACK), a Channel Quality Indicator (CQI) to indicate a DL channel state, a Scheduling Request (SR) (i.e., an uplink radio resource allocation request), and so on.

A PUSCH is mapped to an Uplink Shared Channel (UL-SCH) (i.e., a transport channel). UL data transmitted on the PUSCHs can be a transport block which is a data block for UL-SCHs transmitted during a TTI. The transport block can be user information. In alternative example, the UL data can be multiplexed data. The multiplexed data can be a multiplexing of the transport block for the UL-SCHs and the control information. For example, control information multiplexed with data can include a CQI, a Precoding Matrix Indicator (PMI), an HARQ, a Rank Indicator (RI), and so on. In alternative example, the UL data may be composed of only the control information.

The reference signals, in general, are transmitted in a sequence. A specific sequence can be used as the reference signal sequence without special restrictions. A Phase Shift Keying (PSK)-based computer-generated sequence can be used as the reference signal sequence. PSK can include, for example, Binary Phase Shift Keying (BPSK), Quadrature Phase Shift Keying (QPSK), etc. Alternatively, a Constant Amplitude Zero Auto-Correlation (CAZAC) sequence can be used as the reference signal sequence. The CAZAC sequence can include, for example, a Zadoff-Chu (ZC)-based sequence, a ZC sequence with cyclic extension, and a ZC sequence with truncation. Alternatively, a Pseudo-random (PN) sequence can be used as the reference signal sequence. The PN sequence can include, for example, m-sequence, a computer-generated sequence, a Gold sequence, and a Kasami sequence. Further, a cyclically shifted sequence can be used as the reference signal sequence.

A reference signal can be classified into a cell-specific reference signal (CRS), an MBSFN reference signal, and a user equipment-specific reference signal (UE-specific RS). The CRS is transmitted to all the UEs within a cell and used for channel estimation. The MBSFN reference signal can be transmitted in sub-frames allocated for MBSFN transmission. The UE-specific reference signal is received by a specific UE or a specific UE group within a cell, and can be referred as dedicated reference signal (DRS). The DRS is chiefly used by a specific UE or a specific UE group for the purpose of data demodulation.

First, CRS will be described.

Figure 7:
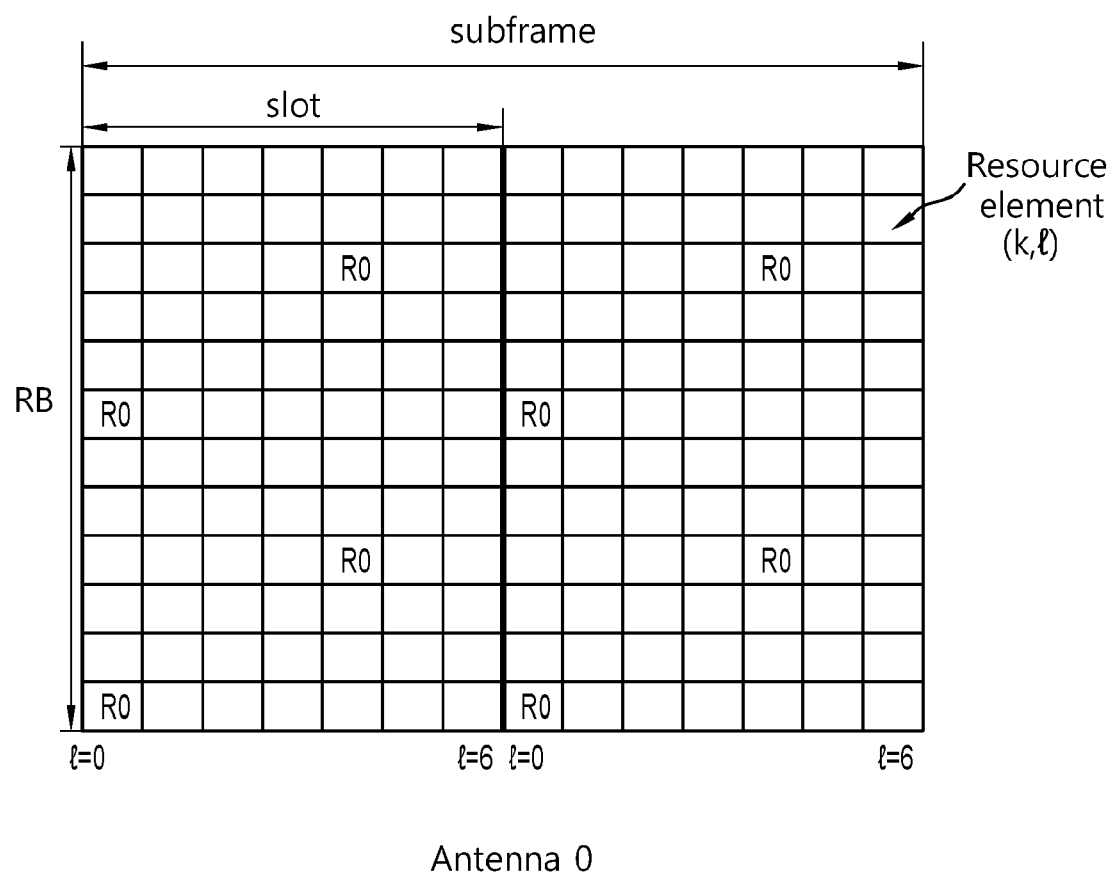
FIGS. 7 to 9 show examples of a DRS structure.
Figure 8:
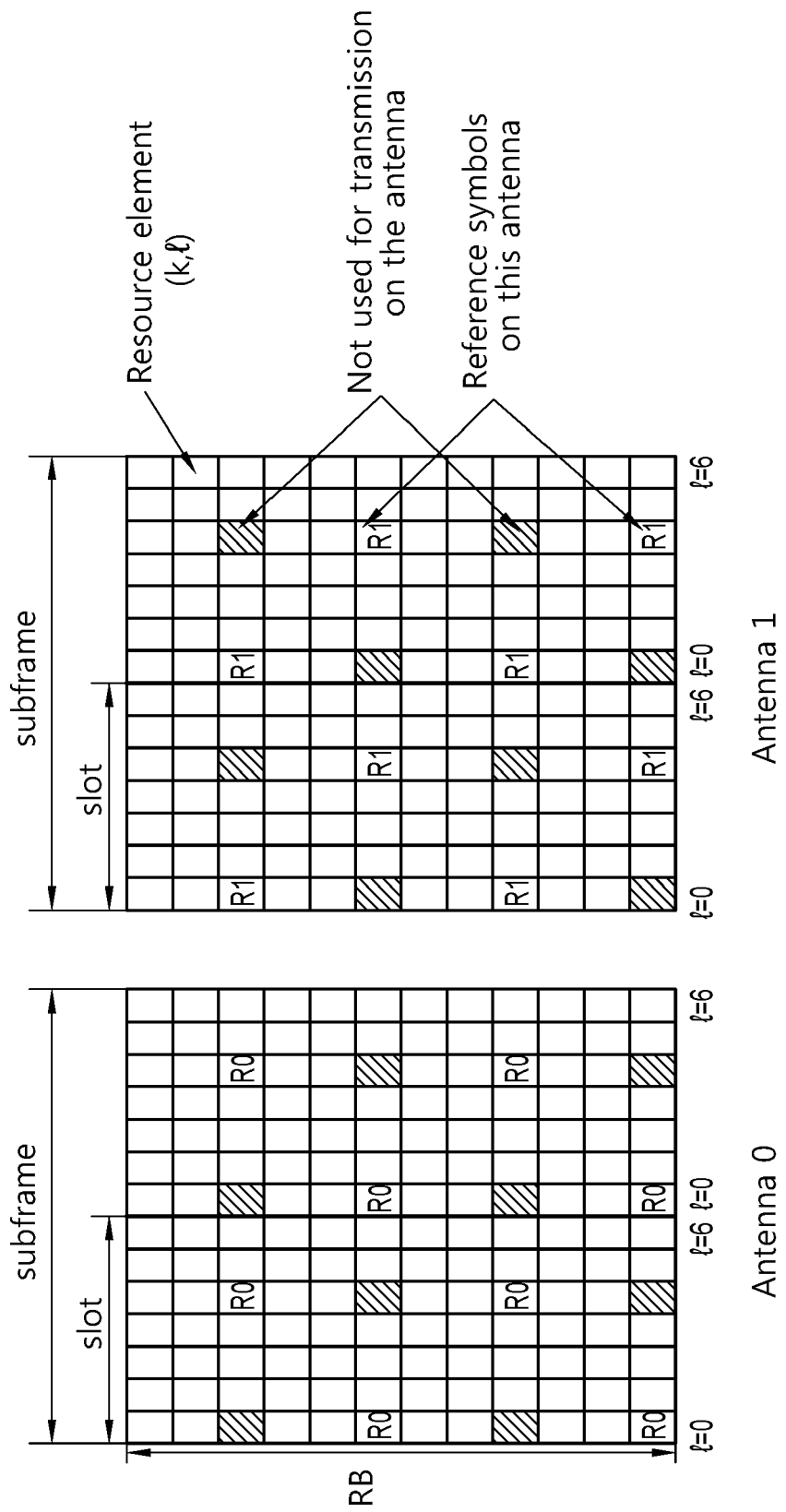
Figure 9:
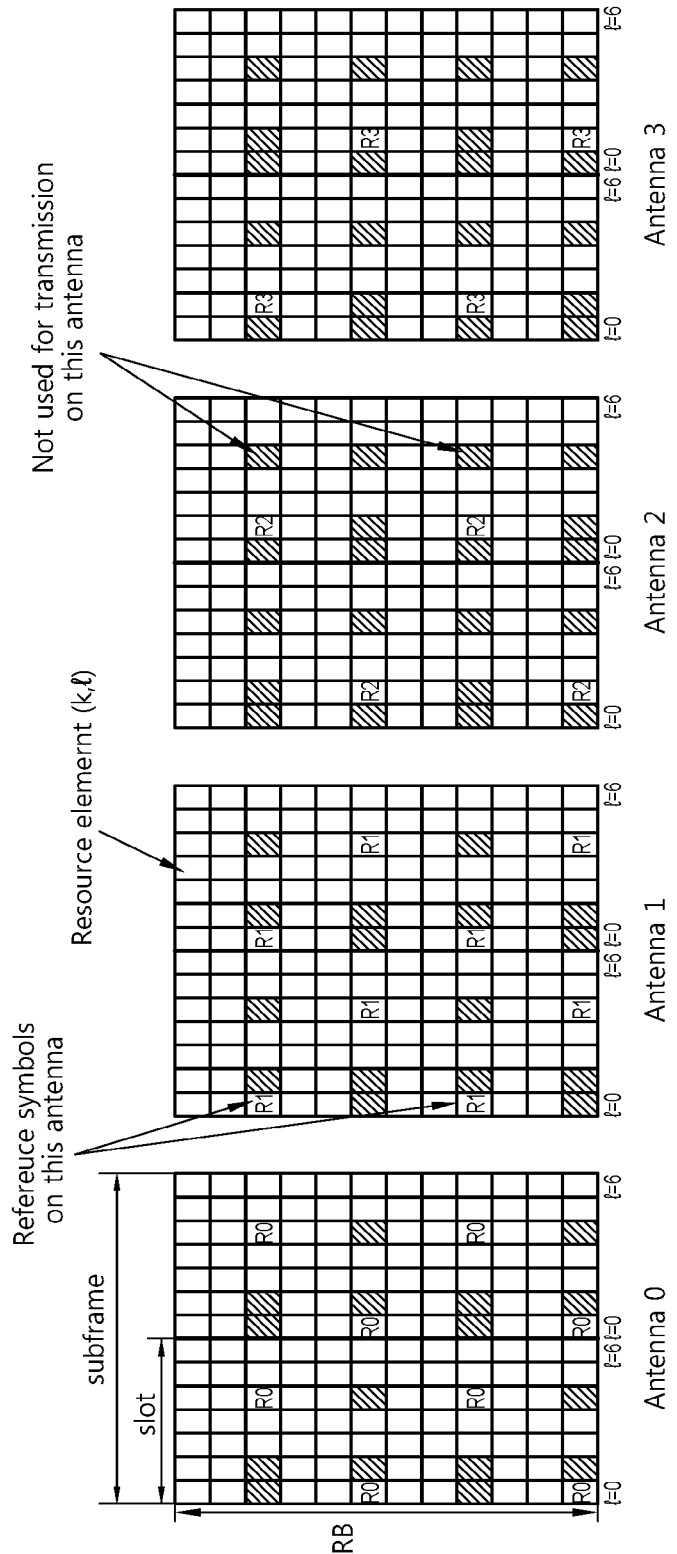

FIGS. 7 to 9 show examples of a DRS structure. FIG. 7 shows an exemplary CRS structure when a BS uses one antenna. FIG. 8 shows an exemplary CRS structure when a BS uses two antennas. FIG. 9 shows an exemplary CRS structure when a BS uses four antennas. The section 6.10.1 of 3GPP TS 36.211 V8.2.0 (2008-03) may be incorporated herein by reference. In addition, the exemplary CRS structure may be used to support a feature of an LTE-A system. Examples of the feature of the LTE-A system include coordinated multi-point (CoMP) transmission and reception, spatial multiplexing, etc. Also, CRS can be used for channel quality estimation, CP detection, and time/frequency synchronization.

Referring to FIG. 7 to FIG. 9, in multi-antenna transmission, a BS uses a plurality of antennas, each of which has one resource grid. 'R0' denotes an RS for a first antenna, 'R1' denotes an RS for a second antenna, 'R2' denotes an RS for a third antenna, and 'R3' denotes an RS for a fourth antenna. R0 to R3 are located in a subframe without overlapping with one another. l indicates a position of an OFDM symbol in a slot. In case of a normal cyclic prefix (CP), l has a value in the range of 0 to 6. In one OFDM symbol, RSs for the respective antennas are located with a spacing of 6 subcarriers. In a subframe, the number of R0s is equal to the number of R1s, and the number of R2s is equal to the number of R3s. In the subframe, the number of R2s and R3s is less than the number of R0s and R1s. A resource element used for an RS of one antenna is not used for an RS of another antenna. This is to avoid interference between antennas.

The CRS is always transmitted by the number of antennas irrespective of the number of streams. The CRS has an independent RS for each antenna. A frequency-domain position and a time-domain position of the CRS in a subframe are determined irrespective of a UE. A CRS sequence to be multiplied to the CRS is generated also irrespective of the UE. Therefore, all UEs in a cell can receive the CRS. However, a position of the CRS in the subframe and the CRS sequence may be determined according to a cell identifier (ID). The time-domain position of the CRS in the subframe may be determined according to an antenna number and the number of OFDM symbols in a resource block. The frequency-domain position of the CRS in the subframe may be determined according to an antenna number, a cell ID, an OFDM symbol index l, a slot number in a radio frame, etc.

The CRS sequence may be applied on an OFDM symbol basis in one subframe. The CRS sequence may differ according to a cell ID, a slot number in one radio frame, an OFDM symbol index in a slot, a CP type, etc. The number of RS subcarriers for each antenna on one OFDM symbol is 2. When a subframe includes $N_{RB}$ resource blocks in a frequency domain, the number of RS subcarriers for each antenna on one OFDM symbol is $2(N_{RB})$. Therefore, a length of the CRS sequence is $2(N_{RB})$.

Equation 2 shows an example of a CRS sequence r(m).

$$r(m) = \frac{1}{\sqrt{2}}(1 - 2 \cdot c(2m)) + j\frac{1}{2}(1 - 2 \cdot c(2m+1)) \quad \text{[Math. 2]}$$

Herein, m is 0, 1, . . . , $2N_{RB,max}-1$. $N_{RB,max}$ denotes the number of resource blocks corresponding to a maximum bandwidth. For example, when using a 3GPP LTE system, $N_{RB,max}$ is 110. c(i) denotes a PN sequence as a pseudo-random sequence, and can be defined by a gold sequence having a length of 31. Equation 2 shows an example of a gold sequence c(n).

$$c(n)=(x_1(n+N_c)+x_2(n+N_c))\bmod 2$$

$$x_1(n+31)=(x_1(n+3)+x_1(n))\bmod 2$$

$$x_2(n+31)=(x_2(n+3)+x_2(n+2)+x_1(n+1)+x_1(n))\bmod 2 \quad \text{[Math. 3]}$$

Herein, $N_c$ is 1600, $x_1(i)$ denotes a $1^{st}$ m-sequence, and $x_2(i)$ denotes a $2^{nd}$ m-sequence. For example, the $1^{st}$ m-sequence or the $2^{nd}$ m-sequence can be initialized for each OFDM symbol according to a cell ID, a slot number in one radio frame, an OFDM symbol index in a slot, a CP type, etc.

In case of using a system having a bandwidth narrower than $N_{RB,max}$, a certain part with a length of $2(N_{RB})$ can be selected from an RS sequence generated in a length of $2(N_{RB,max})$.

Meanwhile, the CRS may be used in the LTE-A system to estimate channel state information (CSI). A reference signal for estimate CSI can be referred as CSI-RS. The CSI-RS is placed sparsely in the frequency domain or the time domain. The CSI-RS may be punctured in the data region of normal subframe or MBSFN subframe. If necessary for estimation of the CSI, channel quality indicator (CQI), a precoding matrix indicator (PMI), a rank indicator (RI), or the like may be reported from the UE.

DRS is described below.

Figure 10:
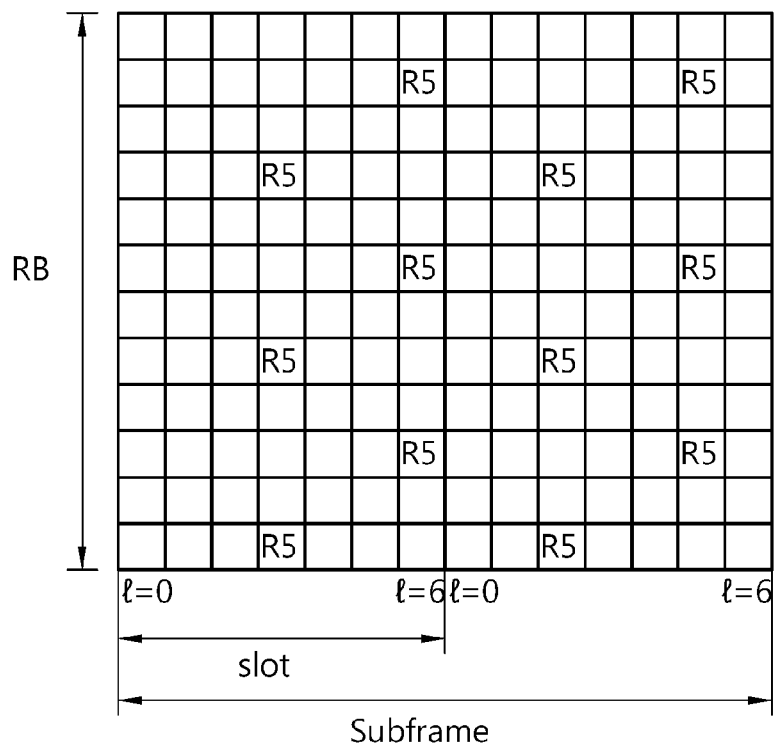
FIGS. 10 and 11 show examples of a DRS structure.
Figure 11:
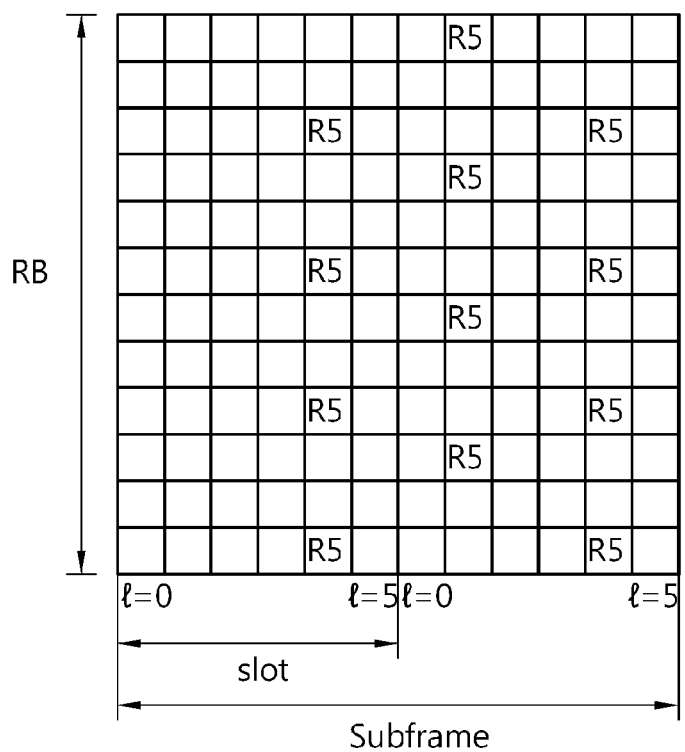

FIGS. 10 and 11 show examples of a DRS structure. FIG. 10 shows an example of the DRS structure in the normal CP (Cyclic Prefix). In the normal CP, a subframe includes 14 OFDM symbols. R5 indicates the reference signal of an antenna which transmits a DRS. On one OFDM symbol including a reference symbol, a reference signal subcarrier is positioned at intervals of four subcarriers. FIG. 11 shows an example of the DRS structure in the extended CP. In the extended CP, a subframe includes 12 OFDM symbols. On one OFDM symbol, a reference signal subcarrier is positioned at intervals of three subcarriers. For detailed information, reference can be made to Paragraph 6.10.3 of 3GPP TS 36.211 V8.2.0 (2008-03).

The position of a frequency domain and the position of a time domain within the subframe of a DRS can be determined by a resource block assigned for PDSCH transmission. A DRS sequence can be determined by a UE ID, and only a specific UE corresponding to the UE ID can receive a DRS.

A DRS sequence can be obtained using Equations 2 and 3. However, m in Equation 2 is determined by $N_{RB}^{PDSCH}$. $N_{RB}^{PDSCH}$ is the number of resource blocks corresponding to a bandwidth corresponding to PDSCH transmission. The length of a DRS sequence can be changed according to $N_{RB}^{PDSCH}$. That is, the length of a DRS sequence can be changed according to the amount of data assigned to a UE. In Equation 2, a first m-sequence $x_1(i)$ or a second m-sequence $x_2(i)$ can be reset according to a cell ID, the position of a subframe within one radio frame, a UE ID, etc. for every subframe.

A DRS sequence can be generated for every subframe and applied for every OFDM symbol. It is assumed that the number of reference signal subcarriers per resource block is 12 and the number of resource blocks is $N_{RB}^{PDSCH}$ within one subframe. The total number of reference signal subcarriers is $12 \times N_{RB}^{PDSCH}$. Accordingly, the length of the DRS sequence is $12 \times N_{RB}^{PDSCH}$. In the case in which DRS sequences are generated using Equation 2, m is 0, 1, ..., $12N_{RB}^{PDSCH}-1$. The DRS sequences are sequentially mapped to reference symbols. The DRS sequence is first mapped to the reference symbol and then to a next OFDM symbol, in ascending powers of a subcarrier index in one OFDM symbol.

In the LTE-A system, a DRS can be use in PDSCH demodulation. Here, a PDSCH and a DRS can comply with the same precoding operation. The DRS can be transmitted only in a resource block or layer scheduled by a Base Station (BS), and orthogonality is maintained between layers.

Further, a Cell-specific Reference Signal (CRS) can be used together with a DRS. For example, it is assumed that control information is transmitted through three OFDM symbols (l=0, 1, 2) of a first slot within a subframe. A CRS can be used in an OFDM symbol having an index of 0, 1, or 2 (l=0, 1, or 2), and a DRS can be used in the remaining OFDM symbol other than the three OFDM symbols. Here, by transmitting a predefined sequence which is multiplied by a downlink reference signal for each cell, interference between reference signals received by a receiver from neighbor cells can be reduced, and so the performance of channel estimation can be improved. The predefined sequence can be one of a PN sequence, an m-sequence, a Walsh hadamard sequence, a ZC sequence, a GCL sequence, and a CAZAC sequence. The predefined sequence can be applied to each OFDM symbol within one subframe, and another sequence can be applied depending on a cell ID, a subframe number, the position of an OFDM symbol, and a UE ID.

In an LTE rel-8 system, a DRS can be used for single layer beam-forming. Unlike the LTE rel-8 system, an LTE rel-9 system and an LTE-A system support dual layer beam-forming. Accordingly, it is necessary to define a reference signal for supporting such dual layer beam-forming. Further, the LTE-A system is designed to improve the throughput by supporting a maximum of 8 transmission antennas. It is also necessary to define a reference signal for supporting such improvement.

In order to effectively transmit a reference signal, a reference signal pattern can be defined in the unit of a resource block of the frequency domain allocated to a UE and a DRS unique to the UE can be transmitted. Here, the DRSs may be precoded in such a way as to be distinguished from each other as many as the number of layers, thus forming a reference signal pattern, and then transmitted. In some embodiments, the DRSs may not be precoded. Further, in order to maintain backward compatibility with an LTE rel-8 system, the DRSs of the LTE rel-8 system can be used in an LTE rel-9 system or an LTE-A system without change. However, it is necessary to define a reference signal pattern for 8 distinguishable DRSs because the LTE-A system support a maximum of 8 antennas.

Meanwhile, in a TDD system, a DRS for downlink can be allocated to the DwPTS region of a special subframe other than DL subframes. The length of the DwPTS region can be changed according to a configuration of the special subframe shown in Table 2. The number of OFDM symbols not used as the DwPTS region can be any one of 11, 5, 4, 3, and 2 in the case of a normal CP and any one of 9, 4, 3, and 2 in the case of an extended CP, according to the configuration of a special subframe. In case where the DRS is defined in accordance with a reference signal pattern, the DRS has to be defined only within the DwPTS region. Accordingly, a DRS has to be defined in accordance with a reference signal pattern which is always regular irrespective of the length of the DwPTS region.

It is hereinafter assumed that a DRS transmitted from a BS to a UE is used as a DMRS (Demodulation Reference Signal) for PDSCH demodulation, but not limited thereto. A DRS can be used for purposes, such as channel quality estimation, other than PDSCH demodulation.

Figure 12:
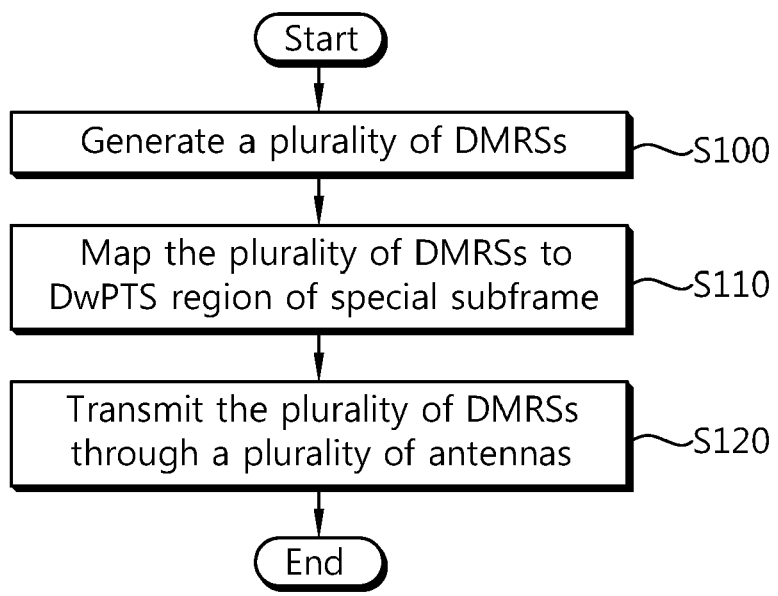
FIG. 12 is a flowchart illustrating a proposed method of transmitting a reference signal according to an embodiment of the present invention.

FIG. 12 is a flowchart illustrating a proposed method of transmitting a reference signal according to an embodiment of the present invention.

At step S100, a BS generates a plurality of DMRSs. At step S110, the BS maps the plurality of DMRSs to the DwPTS region of a special subframe. At step S120, the BS transmits the plurality of DMRSs through a plurality of antennas.

Hereinafter, a variety of reference signals patterns according to the proposed method of transmitting a reference signal are described. In reference signal patterns described below, $R_0$ to $R_3$ indicate CRSs for respective antenna ports 0 to 3 of a 3GPP LTE rel-8 system, and 1 to 4 indicate DMRs for the respective layers 1 to 4 of an LTE-A system. Further, any one of the reference signal patterns described below can be applied to a certain Multiple-Input Multiple-Output (MIMO) situation (i.e., each case of the number of layers or an MIMO mode). Further, it is assumed that the reference signal patterns described below are applied to an MIMO environment in which 8 transmission antennas are supported in downlink, but not limited thereto. The reference signal patterns can also be applied to an environment including a series of beam-formings or Coordinated Multiple Point (CoMP) transmissions. Moreover, the reference signal patterns can be applied to uplink not downlink. In particular, reference signal patterns supporting the layers 1 to 2 can be used as a structure for dual layer beam-forming which is supported in an LTE rel-9 system.

First, a reference signal pattern when the number of layers is 2 is described.

Figure 13:
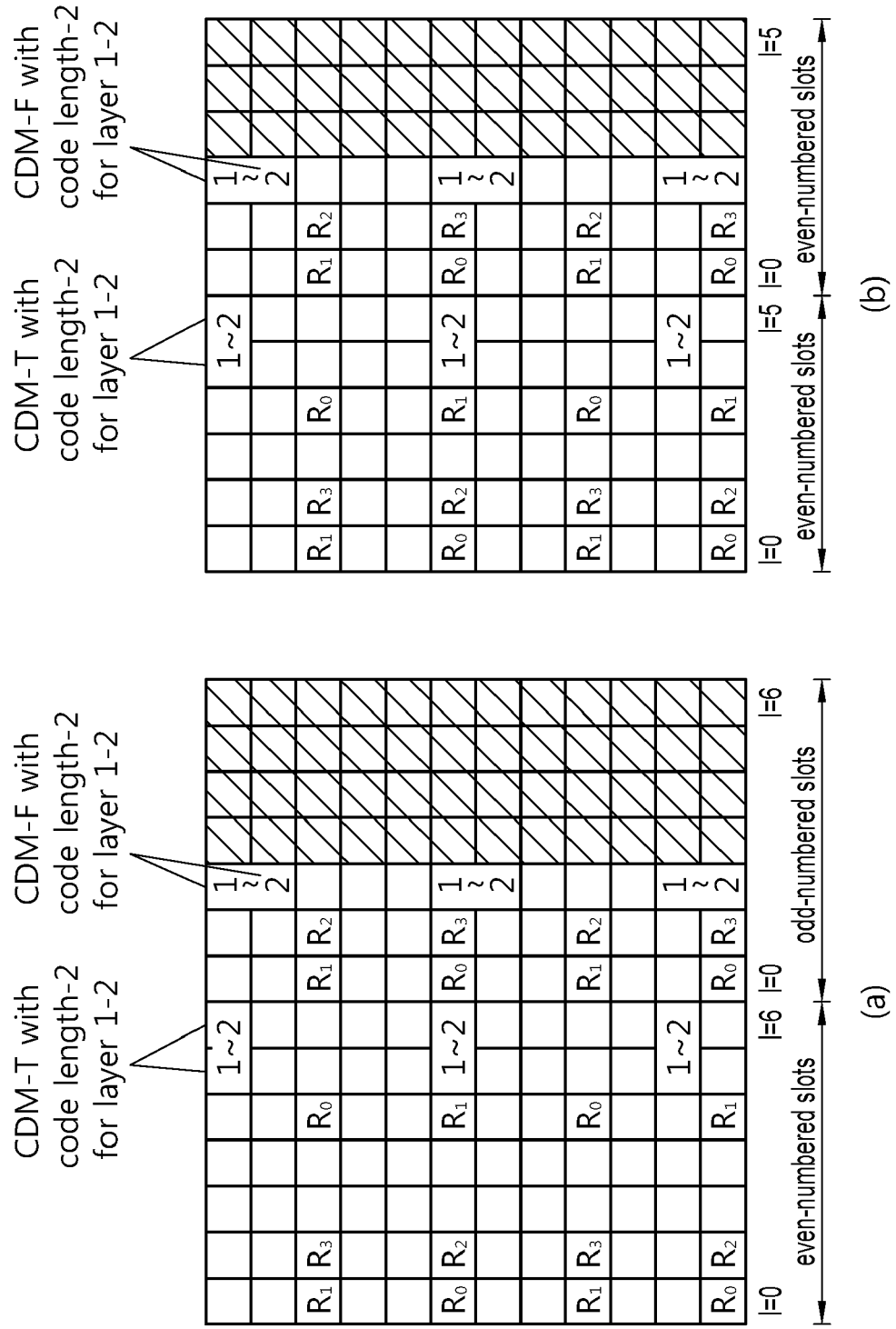
FIGS. 13 to 17 show examples of a reference signal pattern according to the proposed method of transmitting a reference signal.

FIG. 13 shows an example of a reference signal pattern according to the proposed method of transmitting a reference signal.

A reference signal pattern to support a DMRS for two layers irrespective of the length of the DwPTS region of a special subframe can be proposed. The reference signal pattern of FIG. 13(a) corresponds to a reference signal pattern when the DwPTS region occupies 10 to 12 OFDM symbols according to the configuration of a special subframe in the case of a normal CP. The reference signal pattern of FIG. 13(b) corresponds to a reference signal pattern when the DwPTS region occupies 9 or 10 OFDM symbols according to the configuration of a special subframe in the case of an extended CP. A DMRS can be mapped according to a reference signal pattern which is always regular irrespective of the length of the DwPTS region according to the configuration of a special subframe.

In FIG. 13(a), a DMRS for layers 1 and 2 is mapped to the first, sixth, and eleventh subcarriers of sixth and seventh OFDM symbols. The DMRSs for the layers 1 and 2 can be multiplexed in accordance with a Code Division Multiplexing (CDM) method on the basis of two resource elements which are adjacently mapped in the time axis within the same subcarrier. In other words, since the DMRSs for the layers 1 and 2 are multiplexed in accordance with the CDM method in the time domain, it can be said that they are multiplexed in accordance with a CDM-Time (T) method. Further, the DMRS for the layers 1 and 2 is mapped to corresponding resource elements such that the first and second subcarriers of a tenth OFDM symbol form one CDM set, the sixth and seventh subcarriers of the tenth OFDM symbol form another one CDM set, and the eleventh and twelfth subcarriers of the tenth OFDM symbol form yet another one CDM set. The DMRSs for the layers 1 and 2 can be multiplexed in accordance with the CDM method on the basis of the two resource elements which are adjacently mapped in the frequency axis within the corresponding OFDM symbol. In other words, since the DMRSs for the layer 1 and the layer 2 are multiplexed in accordance with the CDM method in the frequency domain, it can be said that they are multiplexed in accordance with a CDM-Frequency (F) method. Meanwhile, in the case in which the number of OFDM symbols occupied by the DwPTS region is 9, the DMRSs multiplexed in accordance with the CDM-F method and mapped to the tenth OFDM symbol cannot be transmitted. Accordingly, only the DMRSs for the sixth and seventh OFDM symbols can be multiplexed in accordance with the CDM-T method and mapped.

In FIG. 13(b), a DMRS for layers 1 and 2 is mapped to the first, sixth, and eleventh subcarriers of fifth and sixth OFDM symbols. The DMRSs for the layers 1 and 2 can be multiplexed in accordance with the CDM-T method on the basis of two resource elements which are adjacently mapped in the time axis within the same subcarrier. Further, the DMRS for the layers 1 and 2 is mapped to corresponding resource elements such that the first and second subcarriers of a ninth OFDM symbol form one CDM set, the sixth and seventh subcarriers of the ninth OFDM symbol form another one CDM set, and the eleventh and twelfth subcarrier of the ninth OFDM symbol form yet another one CDM set. The DMRSs for the layers 1 and 2 can be multiplexed in accordance with the CDM-F method on the basis of the two resource elements which are adjacently mapped in the frequency axis within the corresponding OFDM symbol. Meanwhile, in the case in which the number of OFDM symbols occupied by the DwPTS region is 8, DMRSs multiplexed in accordance with the CDM-F method and mapped to a ninth OFDM symbol cannot be transmitted. Accordingly, only DMRSs for sixth and seventh OFDM symbols can be multiplexed in accordance with the CDM-T method and mapped.

When DMRSs are multiplexed in accordance with the CDM method, an orthogonal sequence can be used. Any one of a Walsh code, Discrete Fourier Transform (DFT) coefficients, and a Constant Amplitude Zero Auto-Correlation (CAZAC) sequence can be used as the orthogonal sequence. In the embodiment of FIG. 13, a sequence having a length of 2 can be used because DMRSs for two layers are multiplexed. For example, a Walsh code having a length of 2 or DFT coefficients having a length of 2 can be used as the orthogonal sequence.

In case where DMRSs are mapped as in the embodiment of FIG. 13, the locations of subcarriers to which the DMRSs for layers 1 and 2, multiplexed in accordance with the CDM-T method, are mapped can be changed. Here, only the locations can be changed while maintaining an interval mapped to the subcarriers. Since the mapping interval is maintained, the DMRSs for the respective layers, multiplexed in accordance with the CDM-T method, can be mapped by informing only the location of a subcarrier to which the DMRS is mapped for the first time. The location of the subcarrier to which the DMRS is mapped for the first time can be determined by a frequency offset. In the embodiment of FIG. 13, the DMRS for each layer is mapped starting from the first subcarrier. Accordingly, the frequency offset can be set to 0.

Figure 14:
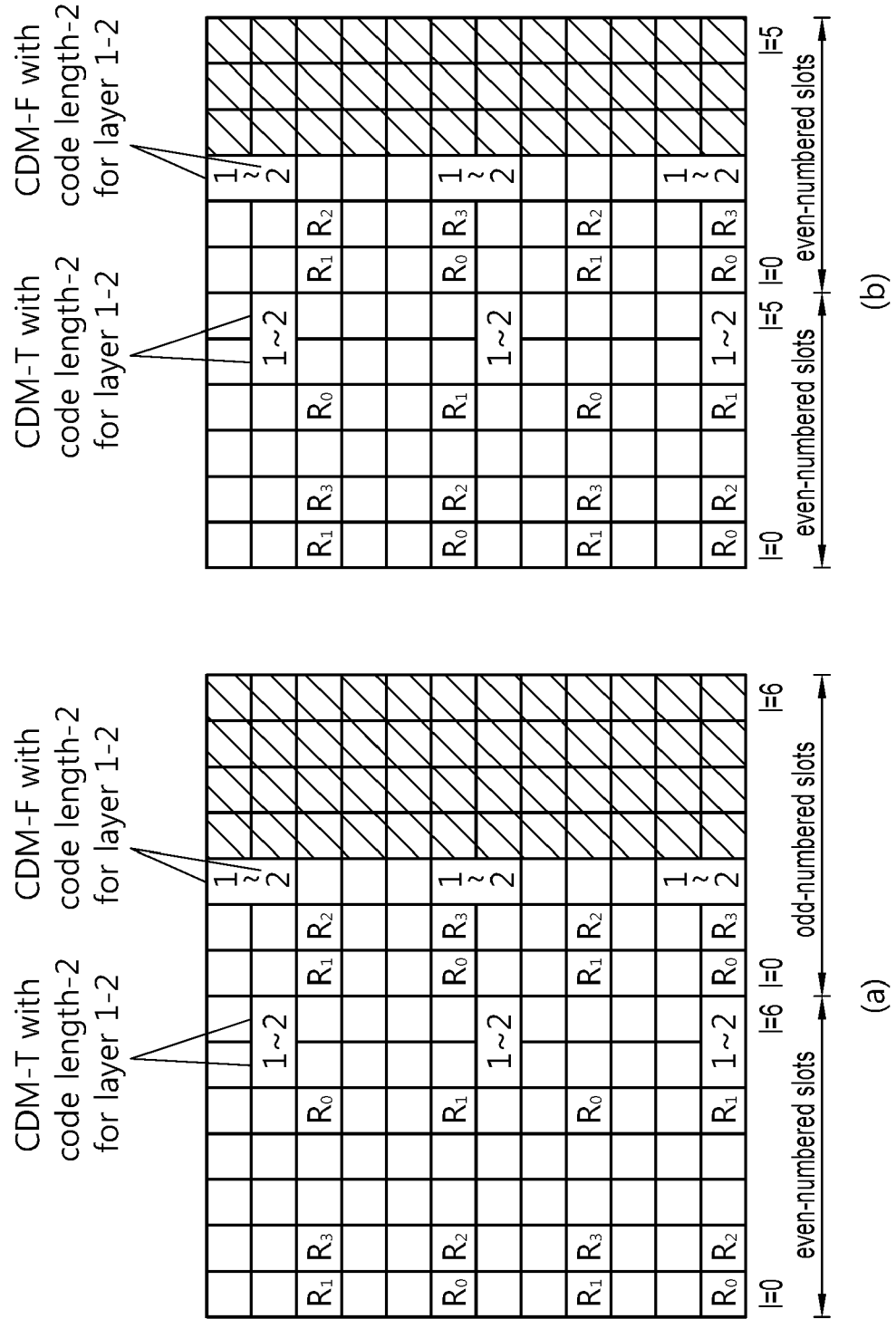

FIG. 14 shows another example of a reference signal pattern according to the proposed method of transmitting a reference signal. The reference signal pattern of FIG. 14 corresponds to a case in which the frequency offset is 1, in the reference signal pattern of FIG. 13, and a detailed description thereof is omitted for simplicity.

A reference signal pattern in case where the number of layers is 4 is described below.

Figure 15:
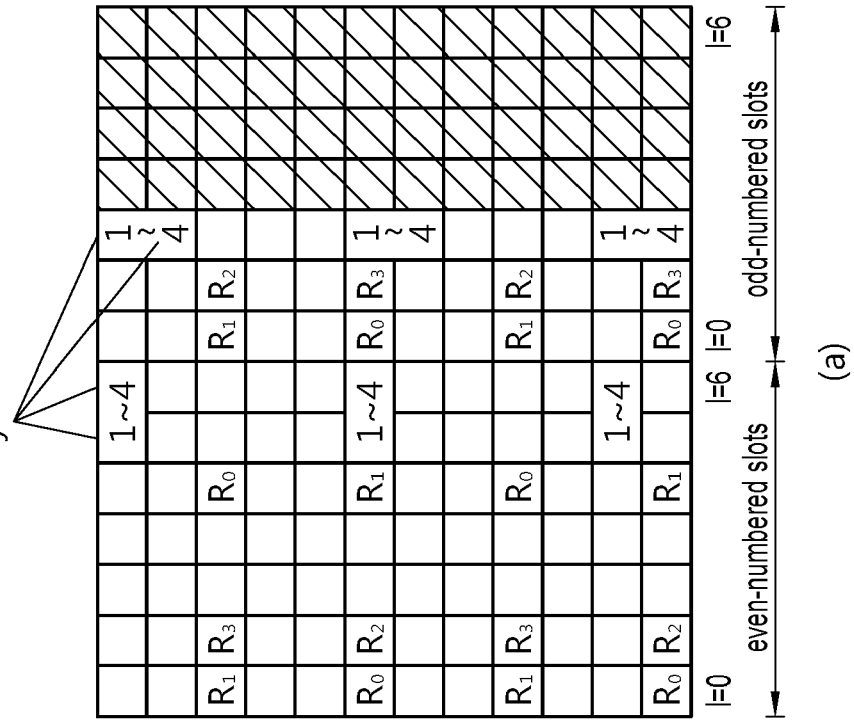

FIG. 15 shows another example of a reference signal pattern according to the proposed method of transmitting a reference signal. The reference signal pattern of FIG. 15(a) corresponds to a reference signal pattern when the DwPTS region occupies 10 to 12 OFDM symbols according to the configuration of a special subframe in the case of a normal CP. The reference signal pattern of FIG. 15(b) corresponds to a reference signal pattern when the DwPTS region occupies 9 or 10 OFDM symbols according to the configuration of a special subframe in the case of an extended CP.

In FIG. 15(a), a DMRS for layers 1 to 4 is mapped to the first subcarrier of sixth and seventh OFDM symbols and the first and second subcarriers of a tenth OFDM symbol, and the layers can be multiplexed and classified in accordance with the CDM method in the time domain and the frequency domain. Further, the DMRS for the layers 1 to 4 is mapped to the sixth subcarrier of the sixth and seventh OFDM symbols and the sixth and seventh subcarriers of the tenth OFDM symbol, and the layers can be multiplexed and classified in accordance with the CDM method in the time domain and the frequency domain. Likewise, the DMRS for the layers 1 to 4 is mapped to the eleventh subcarrier of the sixth and seventh OFDM symbols and the eleventh and twelfth subcarriers of the tenth OFDM symbol, and the layers can be multiplexed and classified in accordance with the CDM method in the time domain and the frequency domain. In other words, since the DMRSs for the layers 1 to 4 are multiplexed in accordance with the CDM method in the time domain and the frequency domain, it can be said that they are multiplexed in accordance with a CDM-T-F method.

In FIG. 15(b), a DMRS for layers 1 to 4 is mapped to the first subcarrier of fifth and sixth OFDM symbols and the first and second subcarriers of a ninth OFDM symbol, and the layers can be multiplexed and classified in accordance with the CDM method in the time domain and the frequency domain. The DMRS for the layers 1 to 4 is mapped to the sixth subcarrier of the fifth and sixth OFDM symbols and the sixth and seventh subcarriers of the ninth OFDM symbol, and the layers can be multiplexed and classified in accordance with the CDM method in the time domain and the frequency domain. Likewise, the DMRS for the layers 1 to 4 is mapped to the eleventh subcarrier of the fifth and sixth OFDM symbols and the eleventh and twelfth subcarriers of the ninth OFDM symbol, and the layers can be multiplexed and classified in accordance with the CDM method in the time domain and the frequency domain. That is, the DMRSs for the layers 1 to 4 can be multiplexed in accordance with a CDM-T-F method. When DMRSs are multiplexed in accordance with the CDM method, an orthogonal sequence can be used. Any one of a Walsh code, DFT coefficients, and a CAZAC sequence can be used as the orthogonal sequence. In the embodiment of FIG. 15, a sequence having a length of 4 can be used because the DMRSs for the 4 layers are multiplexed. For example, a Walsh code having a length of 4 or DFT coefficients having a length of 4 can be used as the orthogonal sequence.

Figure 16:
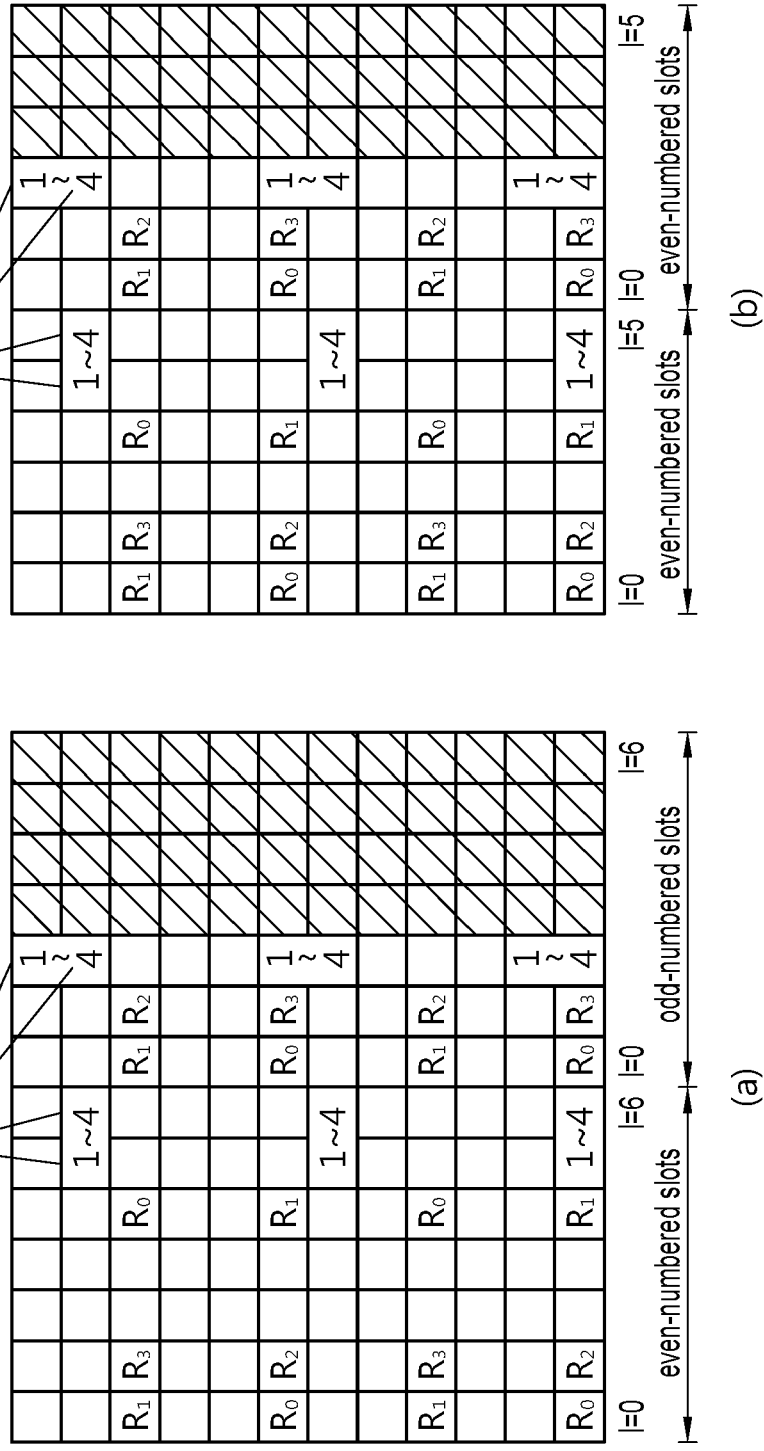

FIG. 16 shows another example of a reference signal pattern according to the proposed method of transmitting a reference signal. Like in FIG. 14, the locations of subcarriers to which DMRSs are mapped can be changed depending on the frequency offset while maintaining an interval. The reference signal pattern of FIG. 16 corresponds to a case in which the frequency offset is 1 in the reference signal pattern of FIG. 15, and a detailed description thereof is omitted.

Figure 17:
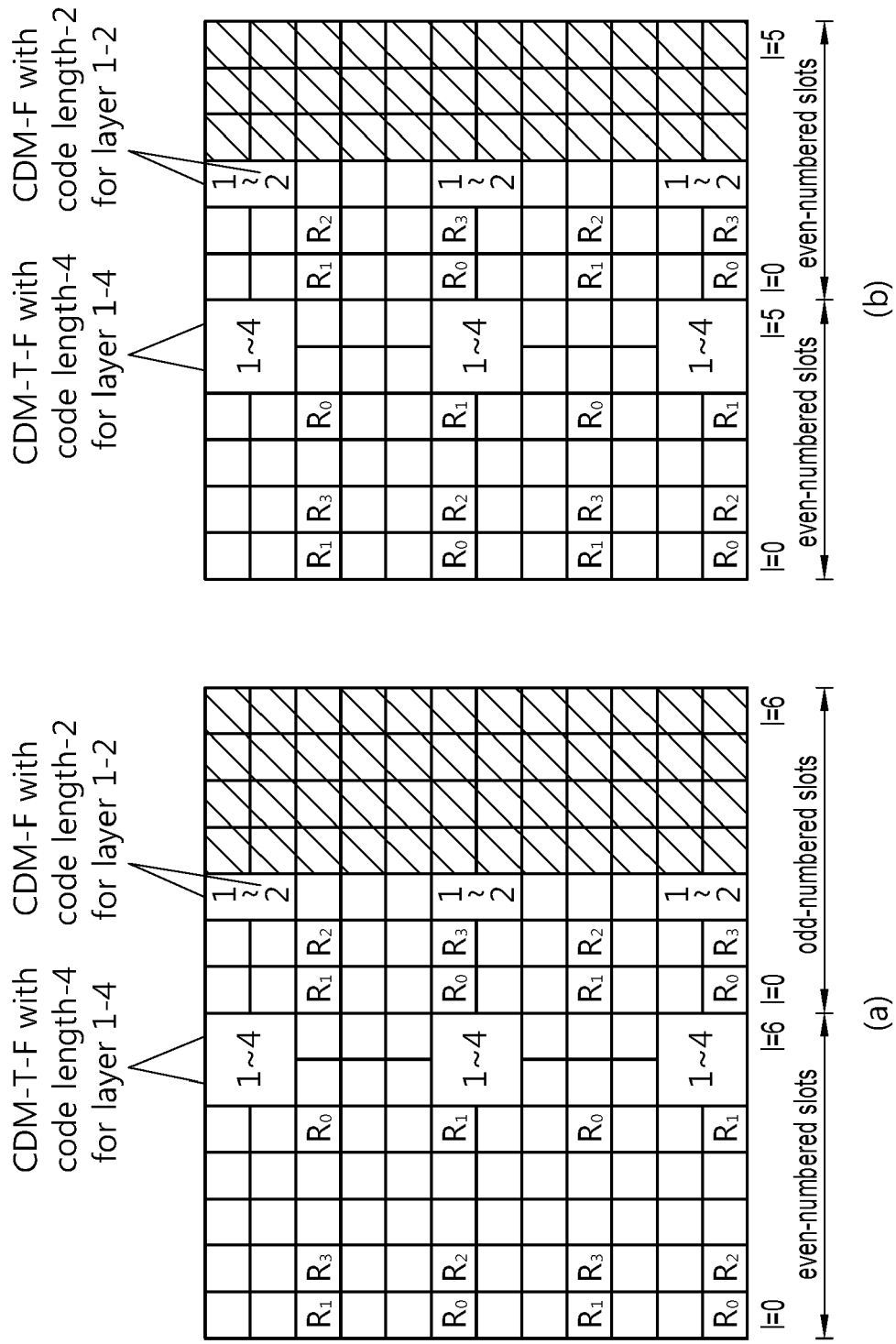

FIG. 17 shows another example of a reference signal pattern according to the proposed method of transmitting a reference signal. The reference signal pattern of FIG. 17(*a*) corresponds to a reference signal pattern when the DwPTS region occupies 9 to 12 OFDM symbols according to the configuration of a special subframe in the case of a normal CP. The reference signal pattern of FIG. 17(*b*) corresponds to a reference signal pattern when the DwPTS region occupies 8 to 10 OFDM symbols according to the configuration of a special subframe in the case of an extended CP.

In case where the DwPTS region occupies 9 to 12 OFDM symbols, in FIG. 17(*a*), a DMRS for layers 1 to 4 is mapped to the first, second, sixth, seventh, eleventh, and twelfth subcarriers of sixth and seventh OFDM symbols. Here, the DMRSs for the respective layers, mapped to the first and second subcarriers, can be multiplexed in accordance with the CDM method. Likewise, DMRSs mapped to the sixth and seventh subcarriers of the sixth and seventh OFDM symbols and DMRSs mapped to the eleventh and the twelfth subcarrier of the sixth and seventh OFDM symbols can be multiplexed in accordance with the CDM method. Since the DMRSs for the layers 1 to 4 are multiplexed in accordance with the CDM method in the time domain and the frequency domain, it can be said that they are multiplexed in accordance with the CDM-T-F method.

In FIG. 17(*b*), a DMRS for layers 1 to 4 is mapped to the first, second, sixth, seventh, eleventh, and twelfth subcarriers of fifth and sixth OFDM symbols. Here, the DMRS for the respective layers, mapped to the first and second subcarriers, can be multiplexed in accordance with the CDM-T-F method. Likewise, DMRSs mapped to the sixth and seventh subcarriers of the fifth and sixth OFDM symbols and DMRSs mapped to the eleventh and twelfth subcarriers of the fifth and sixth OFDM symbols can be multiplexed in accordance with the CDM-T-F method. When the DMRSs are multiplexed in accordance with the CDM-T-F method, an orthogonal sequence can be used. Any one of a Walsh code, DFT coefficients, and a CAZAC sequence can be used as the orthogonal sequence. In the embodiment of FIG. 17, since the DMRSs for the four layers are multiplexed, a sequence having a length of 4 can be used. For example, a Walsh code having a length of 4 or DFT coefficients having a length of 4 can be used as the orthogonal sequence.

Meanwhile, in case where the number of OFDM symbols occupied by the DwPTS region is 10 to 12 in the case of a normal CP and 9 or 10 in the case of an extended CP, additional DMRSs can be allocated in order to increase the throughput of data demodulation or channel estimation. In FIG. 17(*a*), a DMRS for layers 1 and 2 is mapped to the first, second, sixth, seventh, eleventh, and twelfth subcarriers of a tenth OFDM symbol. The DMRSs for the layers 1 and 2 which are adjacently mapped within the corresponding OFDM symbol can be multiplexed in accordance with the CDM-F method. In FIG. 17(*b*), a DMRS for layers 1 and 2 is mapped to the first, second, sixth, seventh, eleventh, and twelfth subcarriers of a ninth OFDM symbol. Likewise, the DMRSs for the layers 1 and 2 which are adjacently mapped within the corresponding OFDM symbols can be multiplexed in accordance with the CDM-F method.

Figure 18:
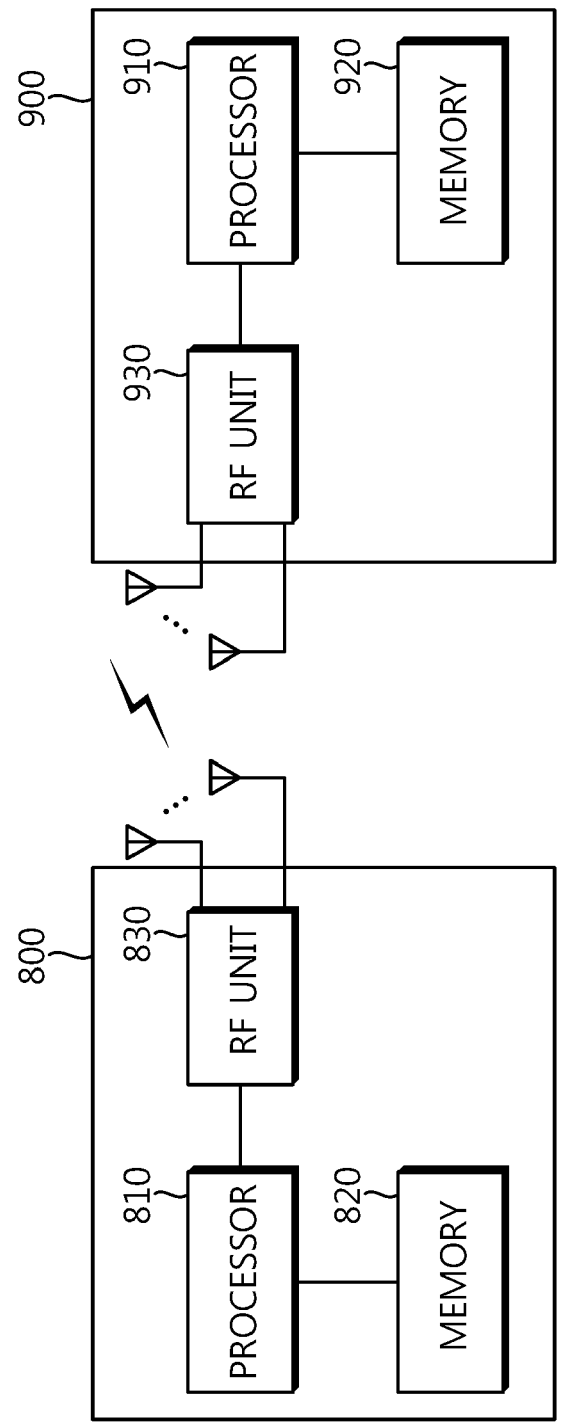
FIG. 18 is a block diagram showing of a BS and a UE in which the embodiments of the present invention are implemented.

FIG. 18 is a block diagram showing of a BS and a UE in which the embodiments of the present invention are implemented.

A BS 800 includes a processor 810, memory 820, and a Radio Frequency (RF) unit 830. The processor 810 implements the proposed functions, processes, and/or methods. The processor 810 generates a plurality of DMRSs for respective layers and maps the plurality of DMRSs to a DwPTS region for downlink transmission within a special subframe. When the DMRSs are mapped by the processor 810, they can be mapped in accordance with the reference signal patterns of FIGS. 13 to 17. The layers of a radio interface protocol can be implemented by the processor 810. The memory 820 is connected to the processor 810 and configured to store various pieces of information for driving the processor 810. The RF unit 830 is connected to the processor 810 and configured to transmit and/or receive a radio signal and to transmit the plurality of DMRSs through a plurality of antennas.

The UE 900 includes a processor 910, memory 920, and an RF unit 930. The RF unit 930 transmits and/or receives a radio signal and receives the plurality of DMRSs from the BS 800 through a plurality of antennas. The processor 910 implements the proposed functions, processes, and/or methods. The processor 910 processes the received DMRSs. The layers of a radio interface protocol can be implemented by the processor 910. The memory 920 is connected to the processor 910 and configured to store various pieces of information for driving the processor 910.

The processor 810, 910 can include an Application-Specific Integrated Circuit (ASIC), other chipset, a logic circuit, and/or a data processor. The memory 820, 920 can include Read-Only Memory (ROM), Random Access Memory (RAM), flash memory, a memory card, a storage medium and/or other storage device. The RF unit 830, 930 can include a baseband circuit for processing a radio signal. When the above embodiments are implemented in software, the above schemes can be implemented using a module (or process or function) for performing the above functions. The module can be stored in the memory 820, 920 and executed by the processor 810, 910. The memory 820, 920 can be placed inside or outside the processor 810, 910 and coupled to the processor 810, 910 using a variety of well-known means.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

The invention claimed is:

1. A method of transmitting a reference signal in a time division duplex (TDD) system, the method comprising:
   generating a plurality of demodulation reference signals (DMRSs) for respective layers;
   mapping the plurality of DMRSs to a downlink pilot time slot (DwPTS) region for downlink transmission within a special subframe; and
   transmitting the plurality of DMRSs through a plurality of antennas,
   wherein the special subframe is a subframe for separating uplink and downlink between an uplink (UL) subframe and a downlink (DL) subframe within a frame,
   wherein the DwPTS region occupies only 10 to 12 orthogonal frequency division multiplexing (OFDM) symbols for the special subframe having a normal cyclic prefix (CP) structure according to the configuration of the special subframe and only 9 or 10 OFDM symbols for the special subframe having an extended CP structure according to the configuration of the special subframe in order to use both a code division multiplexing-time (CDM-T) method and a code division multiplexing-frequency (CDM-F) method based on the plurality of DMRSs, and
   wherein the DwPTS region occupies only 9 orthogonal frequency division multiplexing (OFDM) symbols for the special subframe having a normal cyclic prefix (CP) structure according to the configuration of the special subframe and only 8 OFDM symbols for the special subframe having an extended CP structure according to the configuration of the special subframe in order to use only the CDM-T method based on the plurality of DMRSs.

2. The method of claim 1, wherein the number of layers is 2 or 4.

3. The method of claim 1, wherein the plurality of mapped DMRSs is multiplexed in accordance with a code division multiplexing (CDM) method using an orthogonal sequence.

4. The method of claim 3, wherein the orthogonal sequence includes one of a Walsh code, discrete Fourier transform (DFT) coefficients, and a constant amplitude zero auto-correlation (CAZAC).

5. The method of claim 3, wherein a length of the orthogonal sequence is 2 or 4.

6. The method of claim 1, wherein some or all of the plurality of DMRSs for the respective layers are mapped to neighbor OFDM symbols within an identical subcarrier.

7. The method of claim 1, wherein some or all of the plurality of DMRSs for the respective layers are mapped to neighbor subcarriers within an identical OFDM symbol.

8. The method of claim 1, wherein each of the DMRSs is mapped at a certain subcarrier interval.

9. An apparatus for transmitting a reference signal in a time division duplex (TDD) system, the apparatus comprising:
   a radio frequency (RF) unit; and
   a processor, coupled to the RF unit, and configured to:
   generate a plurality of demodulation reference signals (DMRSs) for respective layers,
   map the plurality of DMRSs to a downlink pilot time slot (DwPTS) region for downlink transmission within a special subframe, and
   transmit the plurality of DMRSs through a plurality of antennas,
   wherein the special subframe is a subframe for separating uplink and downlink between an UL subframe and a DL subframe within a frame,
   wherein the DwPTS region occupies only 10 to 12 orthogonal frequency division multiplexing (OFDM) symbols for the special subframe having a normal cyclic prefix (CP) structure according to the configuration of the special subframe and only 9 or 10 OFDM symbols for the special subframe having an extended CP structure according to the configuration of the special subframe in order to use both a code division multiplexing-time (CDM-T) method and a code division multiplexing-frequency (CDM-F) method based on the plurality of DMRSs, and
   wherein the DwPTS region occupies only 9 orthogonal frequency division multiplexing (OFDM) symbols for the special subframe having a normal cyclic prefix (CP) structure according to the configuration of the special subframe and only 8 OFDM symbols for the special subframe having an extended CP structure according to the configuration of the special subframe in order to use only the CDM-T method based on the plurality of DMRSs.

10. The apparatus of claim 9, wherein the number of layers is 2 or 4.

11. The apparatus of claim 9, wherein the plurality of mapped DMRSs is multiplexed in accordance with a code division multiplexing (CDM) method using an orthogonal sequence.

12. The apparatus of claim 9, wherein some or all of the plurality of DMRSs for the respective layers are mapped to neighbor OFDM symbols within an identical subcarrier.

13. The apparatus of claim 9, wherein some or all of the plurality of DMRSs for the respective layers are mapped to neighbor subcarriers within an identical OFDM symbol.

* * * * *